S. R. PAYNE.
CORN HARVESTER.
APPLICATION FILED JAN. 22, 1913.
1,101,037.
Patented June 23, 1914.
3 SHEETS—SHEET 1.
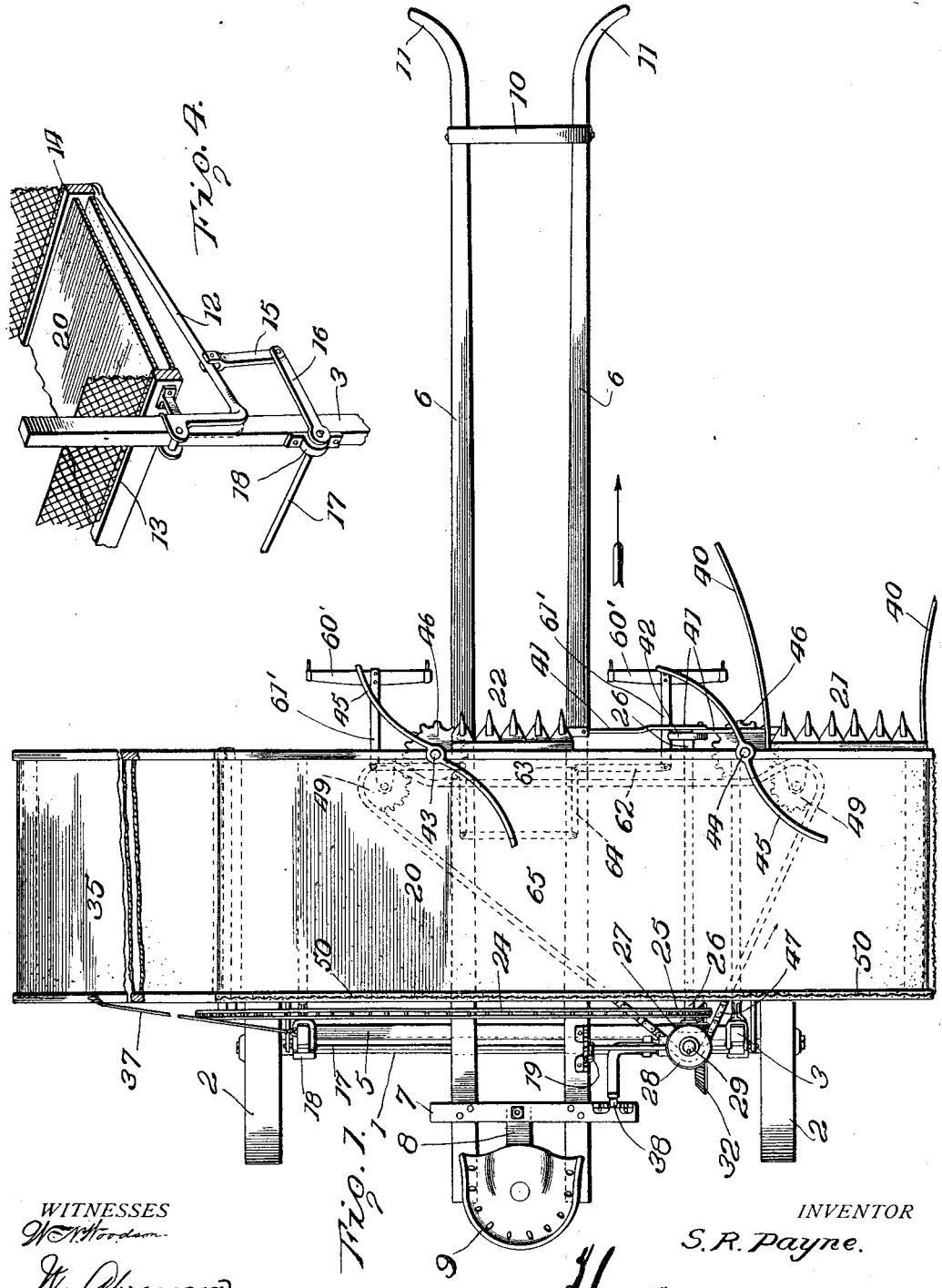
WITNESSES
INVENTOR
S. R. Payne.
Attorneys.

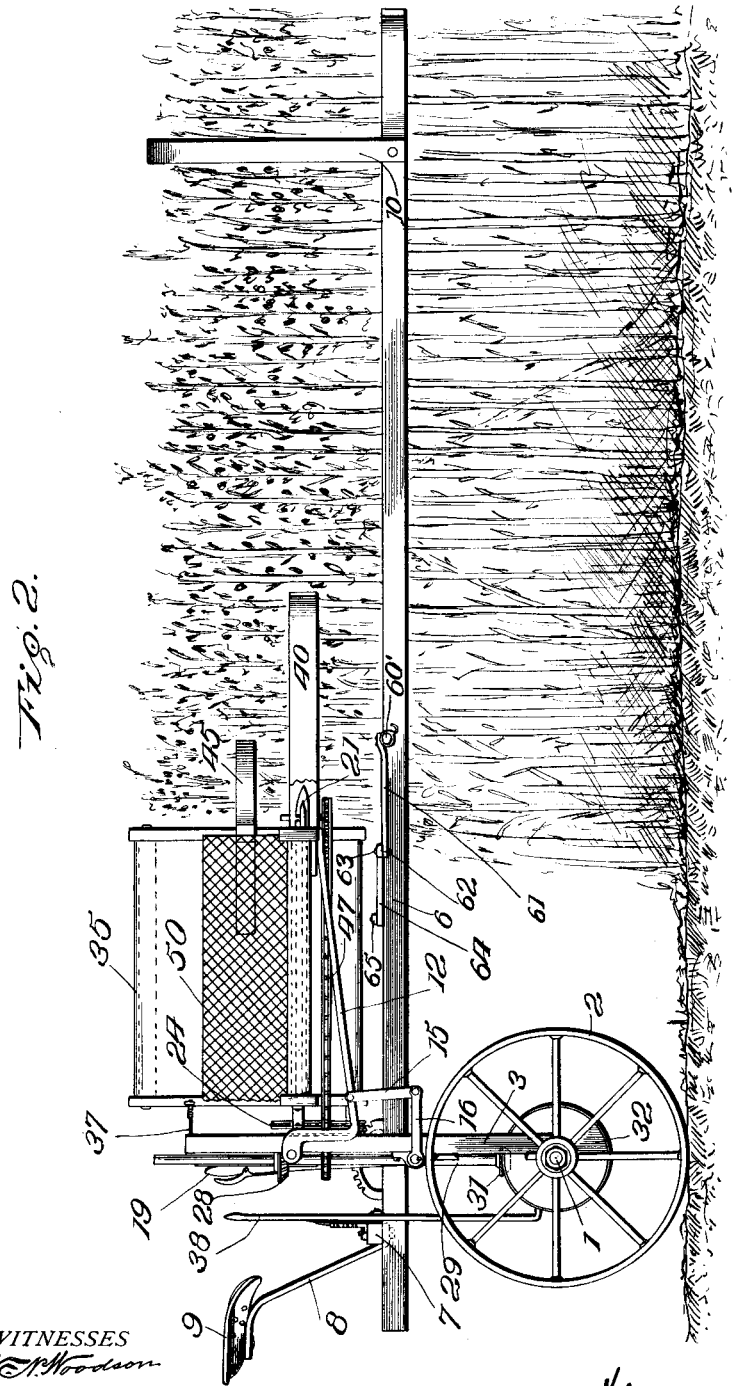

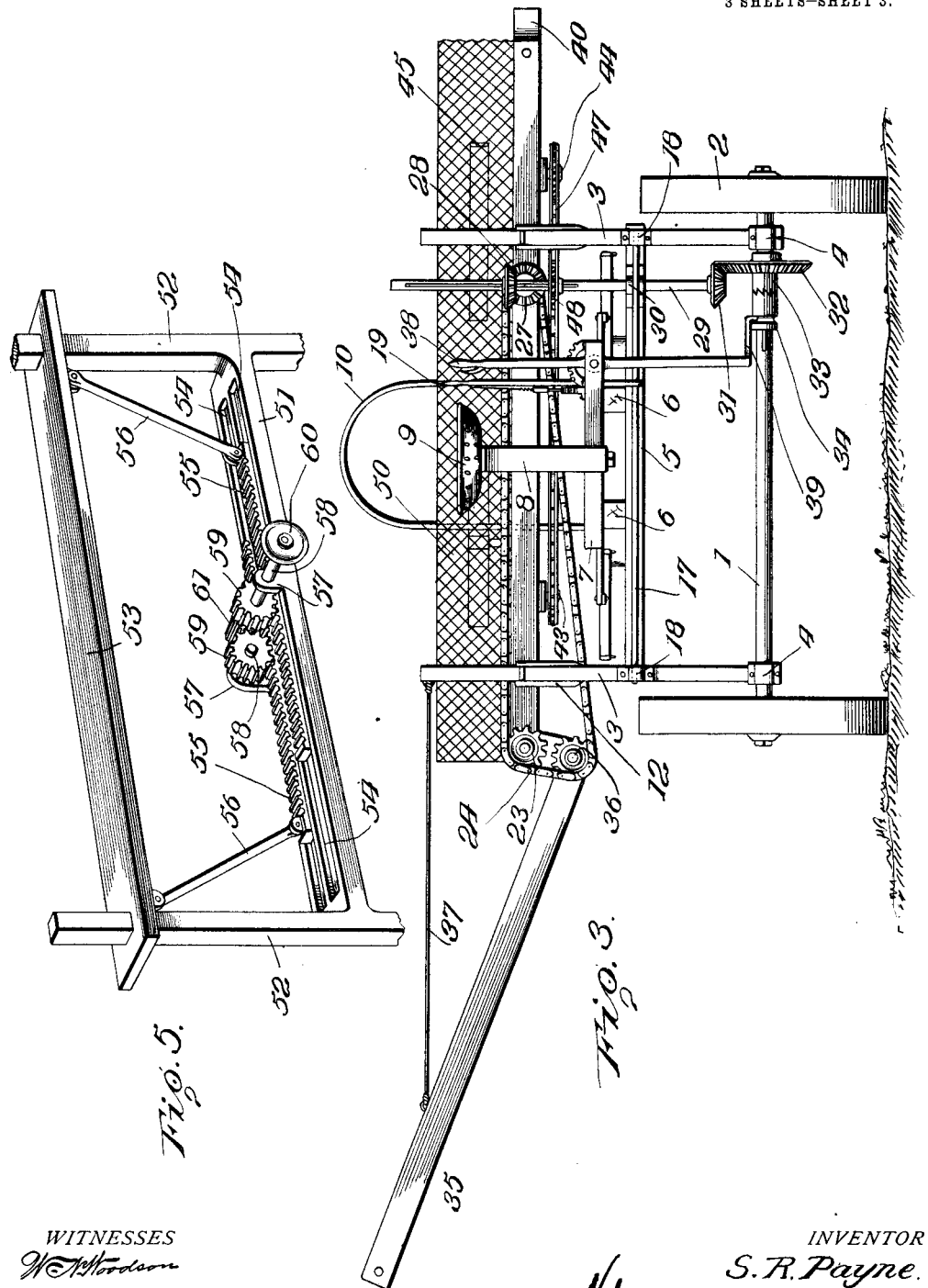

UNITED STATES PATENT OFFICE.

SAMUEL R. PAYNE, OF OXFORD, KANSAS, ASSIGNOR OF ONE-FOURTH TO WALDO CONARD, OF NEWKIRK, OKLAHOMA.

CORN-HARVESTER.

1,101,037.    Specification of Letters Patent.    Patented June 23, 1914.

Application filed January 22, 1913. Serial No. 743,457.

*To all whom it may concern:*

Be it known that I, SAMUEL R. PAYNE, citizen of the United States, residing at Oxford, in the county of Sumner and State of Kansas, have invented certain new and useful Improvements in Corn-Harvesters, of which the following is a specification.

This invention relates to corn harvesters, and has special reference to machines for harvesting Kafir corn.

The objects of the invention are to provide a machine which will be free of complicated mechanism and may be drawn over a field between adjacent rows of corn and, during its forward travel, act upon the standing corn to cut down the same and deposit it in bundles in rows across the field or in a wagon traveling adjacent the harvester; to provide means whereby the cutting apparatus may be readily adjusted according to the height of the corn; and to improve, generally, the construction, arrangement, and operation of a corn harvester to the end that the cost of producing and maintaining the same may be reduced and the efficiency and durability thereof increased.

The stated objects of the invention, and such other objects as will incidentally appear from the following description, are attained in such an apparatus as is illustrated in the accompanying drawings, and the invention consists in certain novel features which will be particularly pointed out in the claims following the description.

In the drawings:—Figure 1 is a plan view of a corn harvester embodying my present invention; Fig. 2 is a side elevation of the same; Fig. 3 is a rear elevation thereof; Fig. 4 is a detail perspective view of a portion of the raising and lowering mechanism; Fig. 5 is a perspective view of a modification.

In carrying out my invention, I employ a frame consisting of an axle 1 having ground wheels 2 secured upon its ends, posts or standards 3 rising from the axle and equipped at their lower ends with boxes 4 to permit the rotation of the axle, a cross bar or beam 5 extending between the posts or standards 3 and tongues 6 secured to and extending forwardly from the said cross beam. The rear ends of these tongues 6 are preferably extended beyond the cross beam 5, and a sill or foot-rest 7 is secured thereon. From the sill or foot-rest 7 rises a seat spring or standard 8 having a seat 9 upon its upper end, as shown. The tongues 6 extending forwardly a sufficient distance to permit draft animals to be harnessed thereto in advance of the cutting mechanism, and adjacent their front ends the said tongues are connected by a yoke 10 which is of a sufficient height to clear the standing corn. The front ends of the tongues are curved outwardly away from each other, as shown at 11, and the tongues should be far enough apart to pass on opposite sides of a row of standing corn as the machine is drawn over the field. A draft animal is placed at the outer side of each tongue, and a check-rein connects each animal with the adjacent side of the yoke. In this manner, I avoid interference between the reins and the plants, inasmuch as a single outside line may then extend from each animal to the driver's seat.

Slidably fitted upon the posts or standards 3, above the tongues 6, are brackets 12 which have upper and lower forwardly extending arms secured respectively to the rear and front beams 13 and 14 of a conveyer supporting frame, as shown most clearly in Fig. 4. Adjacent the rear ends of the brackets 12, links 15 are pivoted thereto, and the lower ends of said links are pivoted to the forwardly extending crank arms 16 rigid with a rock shaft 17 which is journaled in suitable bearings 18 on the posts or standards, as shown. This rock shaft is provided with an operating lever 19 which extends upwardly therefrom adjacent the driver's seat 9 so that, by manipulating the lever, the shaft will be rocked and the crank arms 16 swung up or down. Movement of the crank arms will, of course, be transmitted directly through the links 15 to the brackets 12 and, consequently, the conveyer will be easily and quickly adjusted to the desired height.

The conveyer consists of an endless belt 20 supported upon rollers at the ends of the beams 13 and 14, and the cutters, indicated at 21 and 22, are mounted upon the front side of the front beam 14. The roller supporting the conveyer 20 at the left-hand side of the machine is extended rearwardly beyond the beam 13 and equipped with a sprocket wheel 23 around which passes a sprocket chain 24. The chain 24 also passes around the sprocket wheel 25 on the rear end of a shaft 26 extending transversely between the upper and lower run of the conveyer and journaled in the beams 13 and 14, as will be readily understood. The rear extremity of this shaft 26 is also equipped with a bevel pinion 27 meshing with a similar pinion 28 keyed upon a vertically disposed shaft 29 which is rotatably mounted in a suitable journal box 30 on the rear side of the cross beam 5 and is equipped at its lower end with a bevel pinion 31, as shown. This bevel pinion 31 meshes with a master gear 32 carried by a clutch member 33 loosely fitted upon the axle 1 and adapted to be engaged by a clutch member 34 which is slidable upon the axle and rotatable therewith so that when the clutch members are in engagement, the motion of the axle will be transmitted to the shaft 29 and thence to the sprocket chain 24, whereby the sprocket wheel 23 will be actuated and, consequently, the conveyer 20 caused to travel. The corn deposited upon the conveyer will thereby be carried to the left side of the machine and will be deposited upon an elevator 35 in the form of an endless belt or apron and be thereby discharged into a wagon driven over the field alongside the harvester or may be dropped upon the ground in a row so that it may be easily gathered subsequently. Motion is imparted to the elevating belt 35 by a sprocket pinion 36 on the roller at the lower end of the belt and driven by the sprocket chain 24, as will be readily understood on reference to Fig. 3. The elevator is held in the proper position by a brace 37 secured thereto and to the adjacent post or standard 3. The clutch member 34 may be moved into and out of engagement with the clutch member 33 by any convenient mechanism, and I have illustrated a lever 38 fulcrumed upon the foot-rest or sill 7 and equipped at its lower end with a yoke or fork 39 engaging an annular groove in the clutch member 34 so that, when the lever is oscillated, the clutch member will be moved longitudinally upon the axle, while at the same time it may freely rotate without disturbing the engagement of the yoke therewith.

The cutting mechanism, indicated at 21 and 22, as before stated, is mounted on the front side of the front beam 14, and the cutter 22 is disposed between the planes of the tongues 6 so as to act upon the row of corn between the tongues. The cutter 21 is disposed at the end of the beam 14 so as to act upon a second row of plants, and secured to and extending forwardly from the said beam adjacent the cutter are diverging guards or deflectors 40 which serve to pass upon opposite sides of the corn and thereby guide the same to the cutters so that the plants will be positively cut down. It will be understood that one draft animal travels between the inner deflector 40 and the adjacent tongue 6 between two rows of corn, while the other animal travels at the outer side of the other tongue 6 and at that side of the corn which has been previously cleared. The cutters are driven by means of pitmen 41 extending between the knives and a crank disk 42 on the front end of the shaft 26.

Mounted upon the front beam 14, adjacent the cutters, are vertically disposed shafts 43 and 44 equipped at their upper ends with reels or beater arms 45. Upon the lower ends of the said shaft are sprocket wheels 46, and a sprocket chain 47 is trained around the said sprocket wheels and around a driving sprocket pinion 48 on the vertical shaft 29 so as to impart motion to the said shafts 43 and 44, the said sprocket chain being disposed below the conveyer-supporting beams, and idlers 49, indicated in Fig. 1, being disposed adjacent the sprocket 46 to maintain the engagement of the sprocket chain with said sprockets. By this arrangement, I dispose the driving chain below the conveyer or between the runs of the same in rear of the sprockets on the reels so that it can not interfere with the action of the cutters, nor be clogged by parts of corn that might otherwise come in contact therewith. I also avoid interference of the beater arms with the corn which is not in the line of travel of the cutters and, at the same time, bring the beater arms into such position that the corn in the path of the cutters will be effectually forced against them.

Mounted upon the beams 13 and 14, at the right-hand end of the machine and at the rear of the conveyer, is a fender 50 which prevents the corn deposited upon the conveyer falling therefrom and being lost.

The operation of the apparatus will, it is thought, be readily understood from the foregoing description, taken in connection with the accompanying drawings, but may be briefly summarized. The machine having been adjusted to bring the conveyer and the harvesting mechanism, including the cutters and the beaters, into the proper horizontal plane determined by the height of the corn, the team is driven over the field so that the rows of standing plants will be engaged by the cutters and the stalks of corn severed, the upper portions of the stalks falling onto the conveyer and being thereby carried to the left side of the machine, as hereinbefore stated. The beater arms will travel toward the adjacent cutters and will swing around in advance of the plants so as to engage the stalks and bend them over to the cutters so that the cutters cannot ride over the stalks without severing them.

In Fig. 5, I have shown a modified arrangement for raising and lowering the frame supporting the cutters and conveyer.

In this form, the cross beam 51, corresponding to the cross beam 5, may be formed integral with the upper portions of posts or standards 52 which constitute guides for the support 53 upon which the cutting and conveying mechanisms are secured. The cross beam 51 is provided in its upper side with parallel grooves or guides 54, and in these grooves or guides are fitted rack bars 55 which have their outer ends connected by links 56 with the support 53, the ends of the links being pivoted respectively to the racks and to the support, as clearly shown. Adjacent the racks, brackets or bearings 57 are provided on the beam 51, and in the said brackets or bearings are mounted shafts 58 carrying pinions 59 meshing with the respective rack bars. One of the shafts 58 is elongated and provided at its rear end with an operating knob or handle 60, and at its front end is equipped with a pinion 61 meshing with the pinion 59 on the adjacent shaft so that the said pinions 59 will be rotated in opposite directions and, consequently, move the rack bars in or out. As the rack bars are moved inwardly, the lower ends of the links 56 will, of course, be drawn toward the center of the beam 51 and the upper ends of the links will, consequently, be moved downwardly, thereby lowering the support 53, as will be readily understood. When the pinions 59 are rotated in the opposite direction, the support 53 will, of course, be raised. I also provide an evener for the application of the draft. It will be readily seen that if an ordinary doubletree were employed, it would necessarily extend across the tongues in advance of the cutter 22 and, consequently, would strike the standing plants and bend them down out of the line of travel of the cutter. I, therefore, employ the arrangement shown most clearly in Fig. 1, in which the whiffletrees 60' are carried by the front ends of links 61' which are pivoted at their rear ends to the lateral arms 62 of angle levers fulcrumed at 63 upon the rear portions of the tongues. The rearwardly extending arms 64 of the angle levers are connected by a cross bar 65 so that movement of one lever will be transmitted to the other lever and the draft applied evenly to the two sides of the machine.

It will be noted that all the operating mechanism is carried by the two posts or standards 3 and is adjustable vertically thereon without affecting the position of the tongues or other draft appliances so that, while the machine may be readily adjusted to the height of the corn to be cut, the strain upon the draft animals will be constant.

What I claim is:—

1. In corn harvester, the combination of a wheeled supporting frame comprising an axle and spaced standards rising therefrom, brackets having their rear ends slidably mounted upon said standards and having their front ends free, a rock shaft journaled upon said standards, connections between said rock shaft and said brackets whereby the brackets may be adjusted vertically of the standards, a transverse frame extending from and carried by said brackets, a traveling conveyer arranged longitudinally within said frame, cutters on the front side of the said transverse frame, and means for operating the conveyer and the cutters from the wheeled frame.

2. In a corn harvester, the combination of a supporting frame consisting of a wheeled axle, a pair of standards rising from the axle and beam connecting said standards above the axle, a vertical shaft journaled on said beam, gearing connecting said shaft with the axle, a frame disposed transversely of the standards in front of the same, supports for said frame mounted on the standards and projecting forwardly therefrom, means for moving said supports vertically, a traveling conveyer carried by said frame, cutters on the front side of said frame, and gearing carried by said frame and driven by said vertical shaft to actuate the conveyer and the cutters.

3. In a corn harvester, the combination of a pair of standards, a wheeled axle journaled upon the lower ends of the standards, a beam connecting said standards, a vertical shaft journaled on said beam, means whereby said shaft may be rotated from the axle, brackets slidably mounted on said standards above the beam and projecting forwardly from the standards, a rock shaft journaled on the standards below said brackets, crank arms on said shaft, links connecting said crank arms with the brackets, a conveyer frame secured upon and extending across said brackets, a conveyer within said frame, cutters on the front side of said frame, gearing on the rear side of said frame actuated by said vertical shaft to operate the conveyer, and gearing mounted on the bottom of the frame and actuated by the vertical shaft to operate the cutters.

In testimony whereof I affix my signature in presence of two witnesses.

SAMUEL R. PAYNE. [L. S.]

Witnesses:
 W. V. REESE,
 A. BLANK.

---

Copies of this patent may be obtained for five cents each, by addressing the "Commissioner of Patents, Washington, D. C."